United States Patent
Petersen et al.

(10) Patent No.: US 6,754,227 B1
(45) Date of Patent: Jun. 22, 2004

(54) METHOD AND A DEVICE IN TELECOMMUNICATION SYSTEMS

(75) Inventors: Lars-Göran Petersen, Tumba (SE); Ulf Ekstedt, Saltsjöbaden (SE); Patrik Wiss, Stockholm (SE); Ola Dagberg, Stockholm (SE); Gunnar Larsson, Tumba (SE); Hans Peter Lippelt, Tyskland (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 770 days.

(21) Appl. No.: 09/675,160

(22) Filed: Sep. 29, 2000

(30) Foreign Application Priority Data

Oct. 18, 1999 (SE) .................................................. 9903761
Mar. 15, 2000 (SE) .................................................. 0000868

(51) Int. Cl.[7] ............................................................ H04J 3/16
(52) U.S. Cl. ............................................ 370/467; 370/395.2
(58) Field of Search ................................. 370/464–467, 370/474–476, 458, 395.1, 395.2, 351–3; 709/227–232

(56) References Cited

U.S. PATENT DOCUMENTS

| | | | |
|---|---|---|---|
| 5,689,553 A | | 11/1997 | Ahuja et al. |
| 5,905,873 A | | 5/1999 | Hartmann et al. |
| 6,563,816 B1 | * | 5/2003 | Nodoushani et al. ........ 370/352 |
| 6,631,133 B1 | * | 10/2003 | Christie et al. ........... 370/395.2 |
| 6,680,952 B1 | * | 1/2004 | Berg et al. ................... 370/467 |
| 6,687,243 B1 | * | 2/2004 | Sayers et al. ............... 370/356 |
| 2002/0093947 A1 | * | 7/2002 | Allen et al. ................. 370/352 |
| 2003/0076838 A1 | * | 4/2003 | Shaio et al. .............. 370/395.5 |
| 2003/0231653 A1 | * | 12/2003 | Sprague et al. ............. 370/467 |

FOREIGN PATENT DOCUMENTS

| | | |
|---|---|---|
| EP | 0841831 | 5/1996 |
| EP | 97/44957 | 11/1997 |
| EP | 0814623 | 12/1997 |
| GB | 2323246 | 9/1998 |
| WO | 99/05830 | 2/1999 |

* cited by examiner

Primary Examiner—David Vincent

(57) ABSTRACT

A gateway (MG1) interconnects telecom networks (N1,N2) of different types with different signal formats (ATM,IP). A first control unit (CC1), connected (C1) to a server, controls connection set up. A second control unit (RC2) provides telecom functions (F21–F28), such as speech coder/decoder or echo extinguisher, to the connection. A third control unit (BC3) establishes connections and sets up switch functions (CP21–CP27) corresponding to the different signal formats (ATM,IP). A signal format converter (CP29) converts to/from a common signal format (COM1) that the telecom functions uses. A speech request goes via the server to the first control unit (CC1), which requests telecom function (F21) by the second control unit (RC2). This returns the address (ADR11) of the telecom function to the first control unit (CC1) which sends the function address (ADR11) and the network address (ADR2) of the connection to the third control unit (BC3). This interconnects the corresponding switch function (CP23) and the telecom function (F21) after conversion to the common signal format (COM1) in the signal format converter (CP29). The first control unit (CC1) thereafter requests connection to the next node from the third control unit (BC2), which establishes and indicates the connection (C41) to the first control unit (CC1). This requests setting up of a corresponding switch function (CP21) by the third control unit (BC3), which connects together the switch function with the telecom function (F21) after reconversion of the signal format. The functions (F21–F28;CP21–CP27) are hardware or software. They can easily be supplemented for new network types or new telecom services.

12 Claims, 12 Drawing Sheets

COM1

| Octet Bit | 8 | 7 | 6 | 5 | 4 | 3 | 2 | 1 |
|---|---|---|---|---|---|---|---|---|
| 1 | VPI | | | | | | | |
| 2 | VPI | | | | VCI | | | |
| 3 | VCI | | | | | | | |
| 4 | VCI | | | | PT | | | CLP |
| 5 | ATM-HEC | | | | | | | |
| 6 | CID | | | | | | | |
| 7 | LI | | | | | | UUI | |
| 8 | UUI | | | AAL2-HEC | | | | |
| 9..(LI+9) | AAL2U payload | | | | | | | |
| (LI+10)..53 | PAD | | | | | | | |

Fig. 9

METHOD AND A DEVICE IN TELECOMMUNICATION SYSTEMS

This application claims priority under 35 U.S.C. §§119 and/or 365 to 9903761-6 and 0000868-0 filed in Sweden on Oct. 18, 1999 and Mar. 15, 2000, respectively; the entire content of which is hereby incorporated by reference.

TECHNICAL AREA

The present invention relates to a device and a method for setting up a connection in a telecom system.

STATE OF THE ART

Telecom systems composed of several different types of telecom networks have been developed. The networks can be circuit switched as well as packet switched and can have different types of signal format. The networks, also those packet switched, may transfer information in real time and in some cases provide services of high quality, e.g. high availability, good audibility and uninterrupted communication. The networks are however expensive for the operators to manage if the demand for the high quality shall be maintained. These costs can be decreased if the present networks are replaced by an entirely new, packet switched network. This would, however, imply capital destruction. Efforts have therefore been made to create a gateway, through which certain networks can be connected together while maintaining a good quality of the services.

The British patent application GB 2 323 246 A describes a gateway through which mostly internet telephones can be interconnected. These telephones all use signal formats for internet telephony, but these signal formats often differ somewhat from each other. The gateway sets up the connection by converting a message in one signal format for an incoming connection to an intermediate format and thereupon converting it to a format for an outgoing connection. When the message is in the intermediate format it can be signal treated in different respects, e.g. by adding a function for tone detection or speech recognition to the connection.

The international patent application WO 99/05830 describes a telecom system in which a mobile telephone network for speech and text transmission is interconnected with an internet. In an interconnecting unit transferred signals between the signal protocols of the mobile telecom networks and the signal protocols for internet telephony are converted. At the conversion an intermediate PCM-coded signal format can be used. Some examples are given for interconnection of mobile telecom networks and standard IP-networks or IP-routers. Also examples of interconnection of IP-networks with mobile telecom networks having TDMA-protocols for speech or text transmission are indicated.

Also the European patent application EP 0 841 831 A2 describes a telecom network with a gateway which transforms signal formats between different sub-networks. Solutions thus known for interconnecting different telecom networks suffer from drawbacks. One of these is that only some stated types of networks can be interconnected if one solution is chosen, whereas a limited set of other networks can be interconnected if another solution is chosen. Another drawback is that known solutions are little flexible so as to make it complicated to introduce new telecom functions for signal treatment of the connections. It is also complicated to increase the number of different types of networks with different signal formats which can be interconnected.

SUMMARY OF THE INVENTION

The present invention tackles the problems associated with the above mentioned drawbacks, when a connection is set up in a telecom system composed of different telecom networks. Thus, the main problem to be able to set up a connection via all kinds of existing telecom networks is tackled, independently of their respective signal formats, and to be able to add all different existing telecom functions to the telecom connection.

A further problem tackled is to be able to connect to new networks or networks thus far unknown to an operator, the specifications of which are new or are thus far unknown to the operator. New or earlier unused telecom functions shall be able to be included in the management of the telecom connections. These changes shall be able to be executed without affecting earlier implementation of telecom functions or connections to different telecom networks.

Another problem to be tackled is that the different telecom functions and the functions for connecting to the networks shall be able to be hardware or software located anywhere in a gateway interconnecting the networks.

Furthermore the problem to be able to supplement a set up connection with a telecom function and to set up still another subscriber in the connection, is tackled.

In the present description it is stated how to set up a connection in a telecom system. The connection arrives on a certain incoming signal format and is converted to a common signal format, and thereafter necessary telecom functions are added to the connection. The latter is connected further after having been converted from the common signal format to an outgoing signal format. The above mentioned problems with this connection are solved by a method and a device wherein a first control unit receives control signals for the connection from a server. A second control unit associated with the telecom functions exchanges signals with the first control unit and looks for one of the telecom functions that shall be added to the connection. A third control unit associated with the switch functions of the gateway receives signals from the first control unit and aided by these signals is able to set up the telecom function and required switch function in the connection.

Somewhat more exactly the problems are solved by providing for the first control unit information regarding the signal format and network address of the incoming connection. The second control unit receives the signals from the first control unit and aided thereby finds a free telecom function, the address of which is returned to the first control unit. The latter one requires from the third control unit to set up the switch function corresponding to the network address of the connection and also set up the addressed telecom function in the connection. The third control unit performs the required set up so that the connection is received in the gateway and is converted to the common signal format.

The connection is further set up by the first control unit receiving from the server a node address for the connection. The third control unit looks for a free subconnection to the node address and establishes the subconnection and indicates this to the first control unit. This control unit instructs, in the same way as earlier, a signal format converter and a switch function required for reconverting from the common signal format to a signal format for the established subconnection.

There is thus an aim of the present invention to be able to set up a connection in a telecom system that includes all kinds of existing telecom networks, independently of the signal format, and to add different telecom functions to the connection.

Another aim is to be able to connect to new telecom networks and incorporate new telecom functions for setting up a connection. This shall not affect the gateway otherwise, in other words, it shall not affect the way of connecting to earlier networks or the implementation of earlier telecommunication functions.

Still a further aim is that the telecom functions and the switch functions for connecting the networks shall be able to be hardware or software which is located anywhere within a gateway.

There is an advantage with the invention that the gateway easily can be set up for interconnecting all known types of telecom networks.

Another advantage is that older telecom networks can be used, which results in low costs.

A further advantage is that new telecom functions and telecom networks easily can be used.

The invention will now be described more closely by means of preferred embodiments and with reference to the attached drawings.

FIGURE DESCRIPTION

FIG. 9 shows a block diagram of a signal format;

PREFERRED EMBODIMENTS

Figure 1:
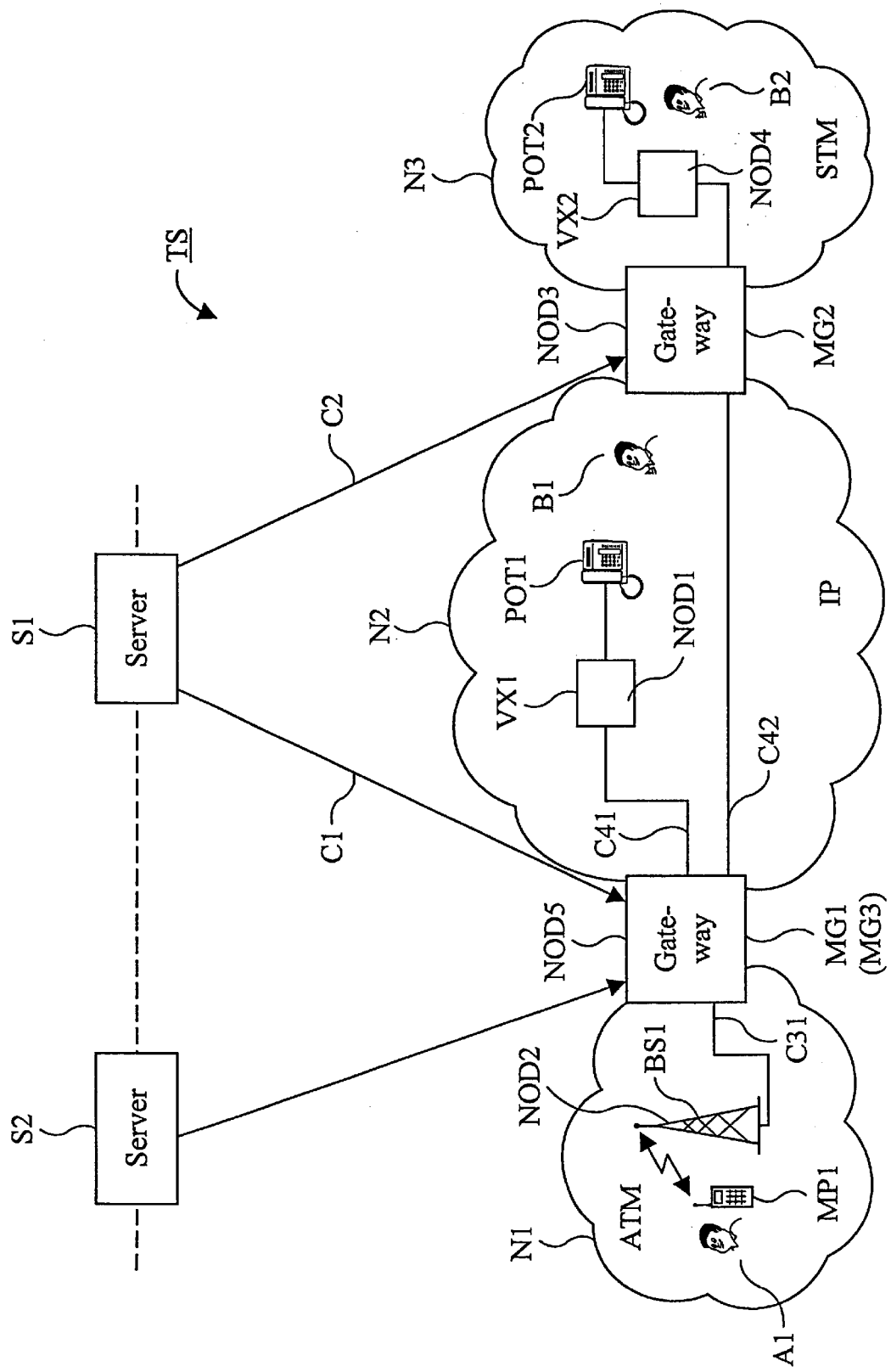
FIG. 1 shows a view of a telecom system.

FIG. 1 illustrates, as an example, a view of a part of a telecom system TS. This includes a first network N1, which is an ATM network, a second network N2, which is an IP network and a third network N3, which is a STM network. The designation ATM stands for Asynchronous Transfer Mode. The other network N2 is connected to the first network N1 through a first gateway MG1 on the one hand, and on the other hand to the third network N3 through a second gateway MG2. The telecom system also includes a control server S1 for controlling setting up of connections. The server S1 is connected to the gateway MG1 via a connection C1 and with the gateway MG2 via a connection C2. The Figure also shows that further servers, e.g. the server S2, are included in the telecom system and is, in the example, connected to the gateway MG1. In the network N1 there is a first telecom subscriber A1 with a mobile telephone MP1, which can be set up in its network through a base station BS1. The base station is connected to the gateway MG1 via a connection C31. In the network N2 there is a second subscriber B1 with a usual circuit connected telephone set POT1, which is connected to the gateway MG1 via a telecom switch VX1. The mobile telephone MP1 and the telephone set. POT1 may be connected to each other via the gateway MG1 so as to allow the subscribers A1 and B1 to talk to each other. In the third network N3 there is a third subscriber B2 with a telephone POT2 which is connected to the other gateway MG2 via a switch VX2. Via the gateway MG2 the subscriber B2 can be connected to the other subscribers. The design of the gateways MG1 and MG2 and the setting up of the connection will now be described more closely below by means of some embodiments.

Figure 2:
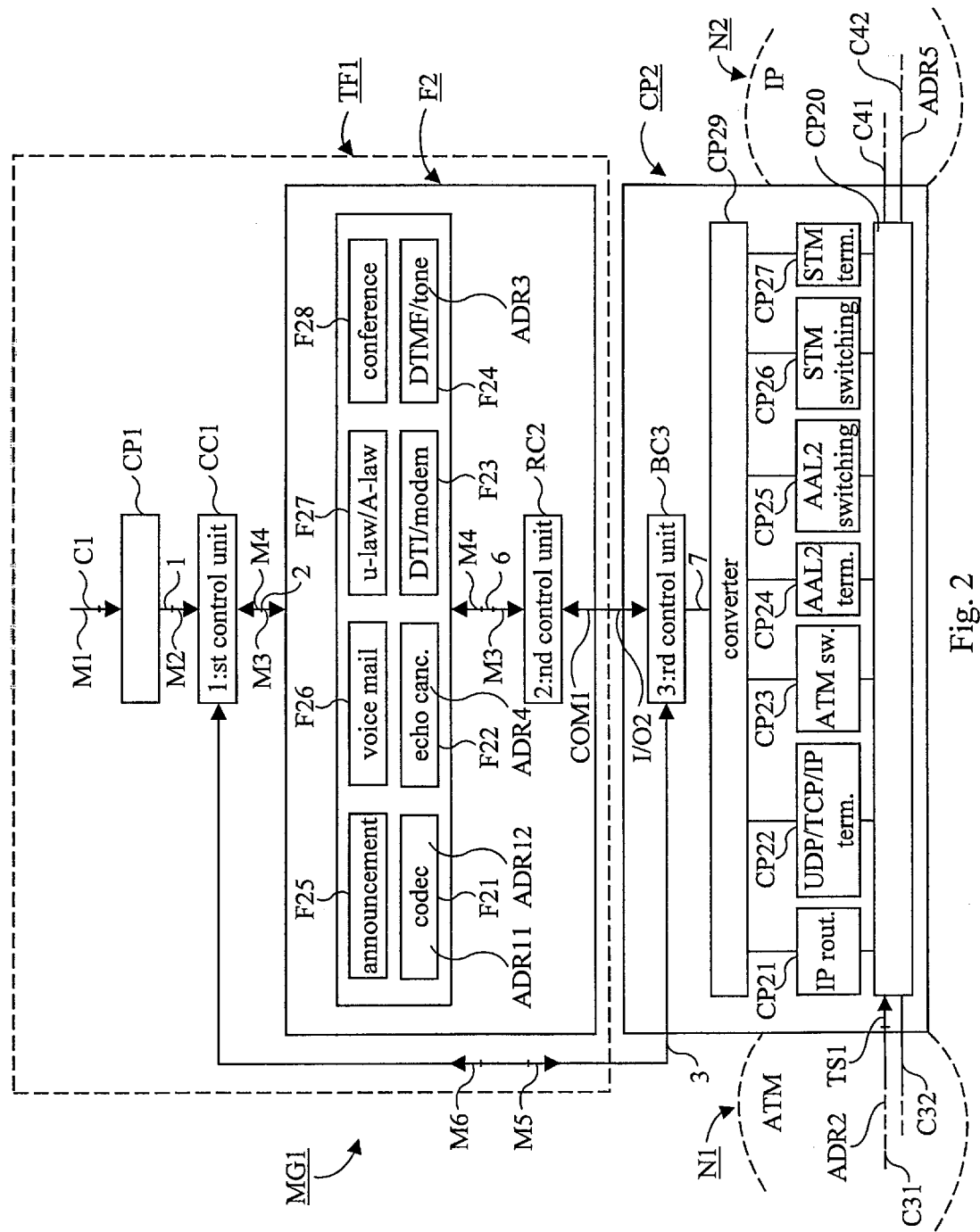
FIG. 2 shows a block diagram of a gateway.

FIG. 2 shows the design of the gateway MG1. It has two main parts, a telecom functional part TF1 and an interface block CP2. The telecom functional part includes a functional block F2 with telecom functions F21–F28 used at telecom connections. According to the embodiment, the function F21 is a coder/decoder, the function F22 is an echo extinguisher, the function F23 is a modem, the function F24 generates a tone signal ordering a ring signal of a subscriber, the function F25 is a message function generating spoken standard messages, the function F26 enables a subscriber to record a voice message, the function F27 transforms between digital u-law and A-law and the function F28 provides for conference call setting up. The telecom function TF1 also includes a signal managing unit CP1 which is connected to the server S1 through the connection C1 and a first control unit CC1 for controlling internally in the gateway MG1 the setting up of a connection. The first control unit CC1 is connected on the one hand to the signal managing unit CP1 through an interface 1, on the other hand to a functional block F2 through an interface 2. The functional block F2 has a second control unit RC2 which is connected to the telecom functions F21–F28 through an interface 6 and that controls the allocation of the resources in these telecom functions.

The interface block CP2 includes a physical line interface CP20 having external connections C31, C32, C41 and C42. In the block CP2 a signal format converter CP29 with switch functions CP21–CP27 for managing transformations of different signal formats of signals being exchanged via the exterior connections. The block CP2 also has a third control unit BC3 which is connected on the one hand to the signal format converter CP29 through an interface 7, on the other hand to a second control unit RC2 via an interface I/02 and is also connected to the first control unit CC1 via an interface 3. In accordance with the embodiment the interface block CP2 has the following switch functions. The function CP21 is an IP route selector, the function CP2 terminates IP, TCP and UDP, the function CP23 connects ATM cells, the function CP24 terminates AAL2 (ATM Adaption Layer type 2), the function CP25 connects AAL2-packets, the function CP26 connects STM channels and the function CP27 terminates STM channels.

The above indicated parts of the gateway MG1 have the following functions.

The signal managing unit CP1 exchanges signals M1 with the server S1 via the connection C1. The unit manages i.a. security and qualification functions, confirms that messages have been received, records arriving and leaving messages and informs the server when status changes in the gateway have taken place. The signal M1 has two parts, one part with an address head and one part with the contents proper, so called payload, which is distributed into different packets. The signal managing unit CP1 separates the address head of a received signal and sends packets intended for this further to the first control unit CC1 via the interface 1.

The first control unit CC1 receives the signal packets, a signal M2, from the signal managing unit CP1 and, guided thereby, asks for necessary ones of the telecom functions F21–F28. The first control unit activates or deactivates external connections appearing from the signal M2 and activates or deactivates internal connections between the telecom functions and the terminal point of the external connections.

The second control unit RC2 manages the earlier mentioned telecom functions F21–F28. The second control unit has information regarding how many copies of a certain telecom function that are available and where the functions are located, i.e. the control unit has the function addresses of the telecom functions. The first control unit CC1 by a signal M3 requires one of the telecom functions from the second control unit. The second control unit emits a message M4 with a functional address for the telecom function, including information regarding the localization of the function, to the first control unit.

As has appeared from the above description the telecom functional part TF1 has the two internal interfaces 1 and 2. The intention of the interface 1 is to keep the reception and management of the message proper M1 separated from the operations caused by the message. Through the interface 2 the first control unit CC1 can reserve the telecom functions F21–F28 for a connection and release them when they are no longer needed for the connection. In the interface block CP2 the line interface CP20 has different types of physical interfaces with different transmission speeds 1.5, 2, 34 or 155 Mbps. The third control unit BC3 can perform the functions to set up the signal format converter CP29 and the switch functions into circuit, to set up one or more of the telecom functions, and to search for and set up a free outgoing part connection to the next node in the connection. To perform this the third control unit receives a signal M5 from the first control unit having information of the incoming connection and of the function address for the telecom function to be set up. The signal M5 can also contain information of a node to which a subconnection shall be connected as a continuation of the incoming connection. The third control unit BC3 emits to the first control unit CC1 a signal M6 which i.a. can contain information regarding the connection set up to the next node. The signal format converter CP29 with the switch functions CP21–CP28 converts incoming signal formats to a common signal format COM1 and also reconverts from this format to an outgoing signal format for the set up connection to the next node.

A principal quality of the gateway MG1 is that the telecom functions in the function block F2 are unchanged and independent of networks to which the gateway is connected. New functions can be added but the functions themselves shall be unchanged over time. Another essential quality of the gateway is that any telecom networks can be connected by means of the gateway and corresponding new switch functions can be added. It is also essential that the telecom functions and switch functions can be stored in the form of hardware or software and can be stored anywhere within its respective block. The gateway can also easily be extended for increased capacity.

The gateway MG1 uses the fact that the signals on the connection C31 or C32 are connected to its respective switch function CP21–CP27 and are thereafter converted to the common signal format COM1 in the converter CP29. The latter thereafter converts the signals to a signal format adapted for the one of the switch functions CP21–CP27 that is used, when the signal shall be sent further on a subconnection to the next node via the connection C41 or C42. Between these two conversions one or several of the telecom functions F21–F28 can be set up via the connection I/02, if necessary for the connection. Furthermore an already assembled active connection between the two subscribers A1 and B1 can be broken up and a further one or several telecom functions be added. Examples of such added functions is the conference call setting up function F28 for setting up further subscribers in the connection or the function F25 with standard messages. All the telecom functions act on the common signal format COM1, which is the format the signals have on the connection I/02. When a connection is set up via the gateway MG1 it can happen that no one of the telecom functions in the functional block F2 needs to be set up. The transferred signals, however, have different formats on the input and on the output and the incoming signal is converted, as mentioned above, to the common signal format in the converter CP29 to be reconverted again to the outgoing signal format.

Among the switch functions CP21–CP27 the routing and setting up functions can also be used directly when the incoming traffic has the same format as the outgoing traffic and no telephony functions shall be used. In these cases the gateway MG1 works as a mere switch and router, respectively, i.e. the traffic is connected directly from a physical/logical input to a physical/logical output. By "logical" is here meant an input/output for e.g. the virtual channels offered by ATM. As an example incoming IP-traffic that shall be routed directly to an output of the gateway can be mentioned. The traffic enters via the line interface CP20 to the switch function CP23 for ATM switching and is there routed to an output and leaves again via the line interface CP20.

The common signal format COM1 can be a format known within the technical field and this is the case in the present embodiment. For the sake of completeness this packet oriented format, called AAL2U, will be described generally with reference to FIG. 9. The designation AAL2U stands for ATM Adaption Layer type 2, where ATM in turn stands for Asynchronous Transfer Mode. The Figure shows a block diagram of the protocol format. In the uppermost line there are fields B, enumerated 1–8, indicating bit number. The lefthand column has fields OC, enumerated 1–53, which indicate octet numbers. In octet No.1 and No.2 there is a virtual path identifier VPI and in octet No. 2, No. 3 and No. 4 there is a virtual channel identifier VCI. In octet No. 4, No. 5 and No. 6 there are quantities PT, CLP, ATM-HEC and CID which are of less interest in the present example. Octet No. 7 has a lenght indicator LI indicating the number of octets for the so called payload of the message, i.a. the information that is desired to be transmitted. The octets No. 7 and No. 8 have an indicator UUI (User-to-User-Indication) and octet No. 8 also has a quantity AAL2-HEC which is of less interest. The octets No. 9 to No. LI+9 contain payload and octets No. LI+10 to No. 53 have a less important quantity PAD.

The gateway MG1, and also the gateway MG2, is built up as has been described in connection with FIG. 2 with the three separate, co-operating control units CC1, RC2 and BC3. It is this structure that enables the gateway to obtain the above stated characteristics. In connection with FIGS. 3, 4, 5, 6, 7 and 8 there will be more closely described, with some embodiments, how the gateway MG1 or MG2 works. Setting up a Connection From Subscriber A1 to Gateway MG1

Figure 3:
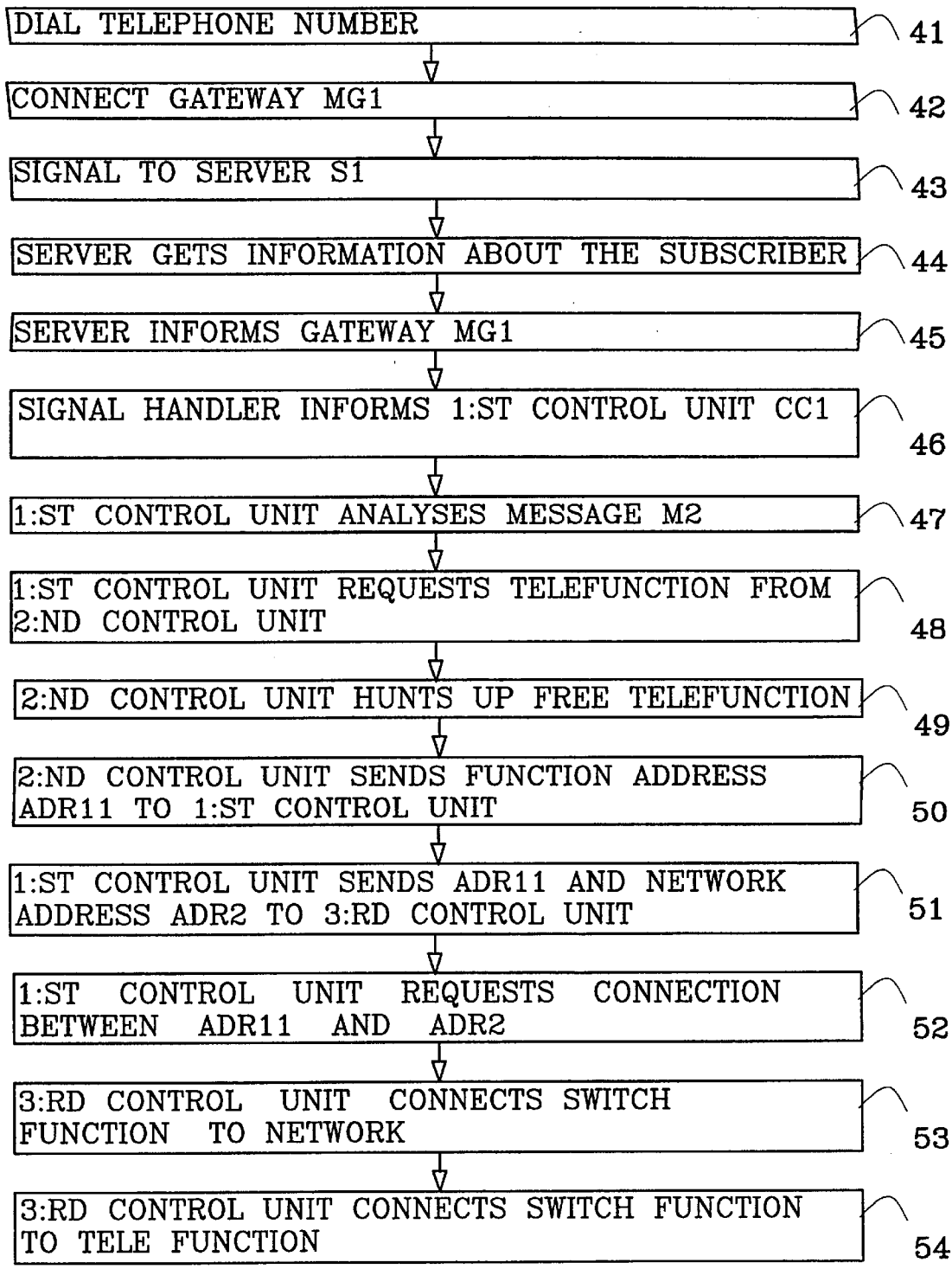
FIG. 3 shows a flow diagram for setting up a connection from a calling subscriber to a gateway.
Figure 4:
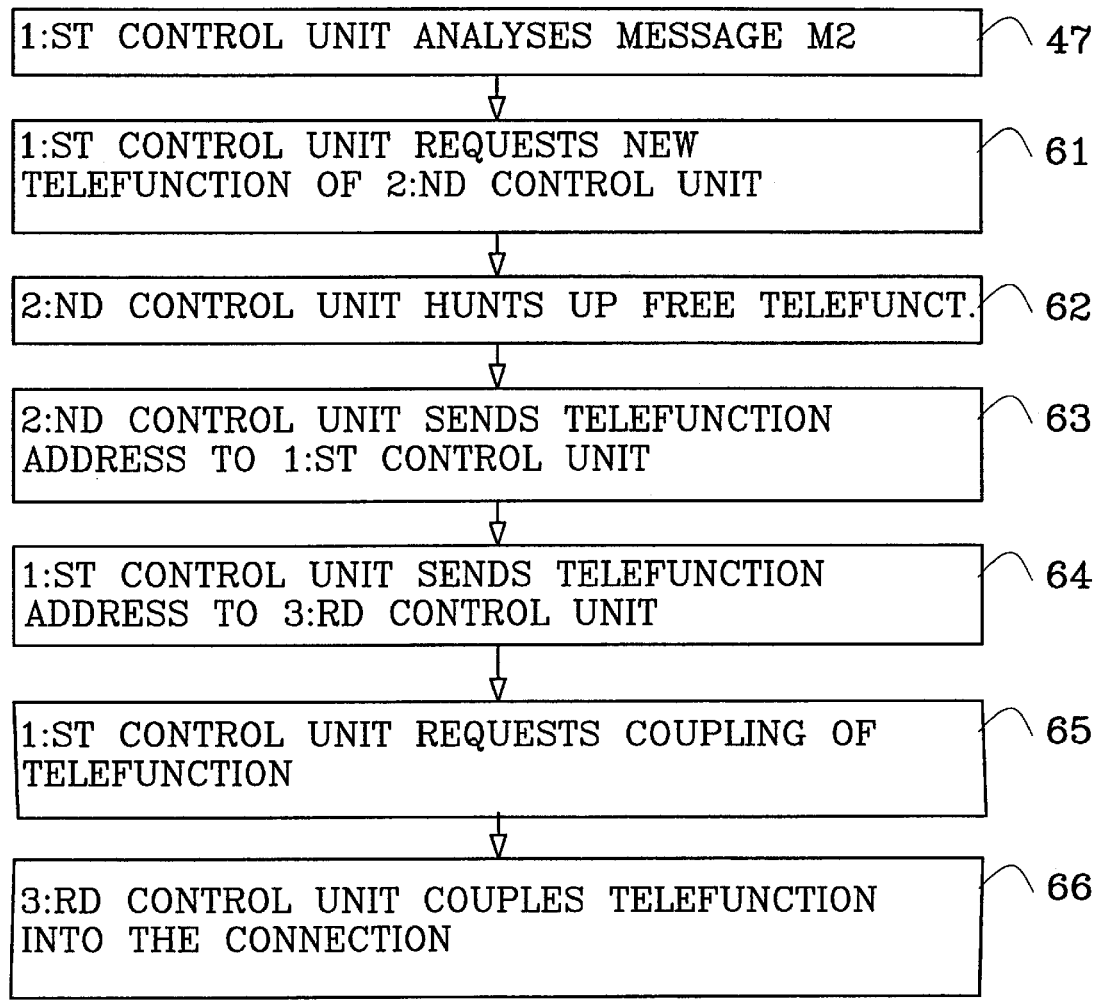
FIG. 4 shows a flow diagram of setting up a telecom function in the connection according to FIG. 3.
Figure 5:
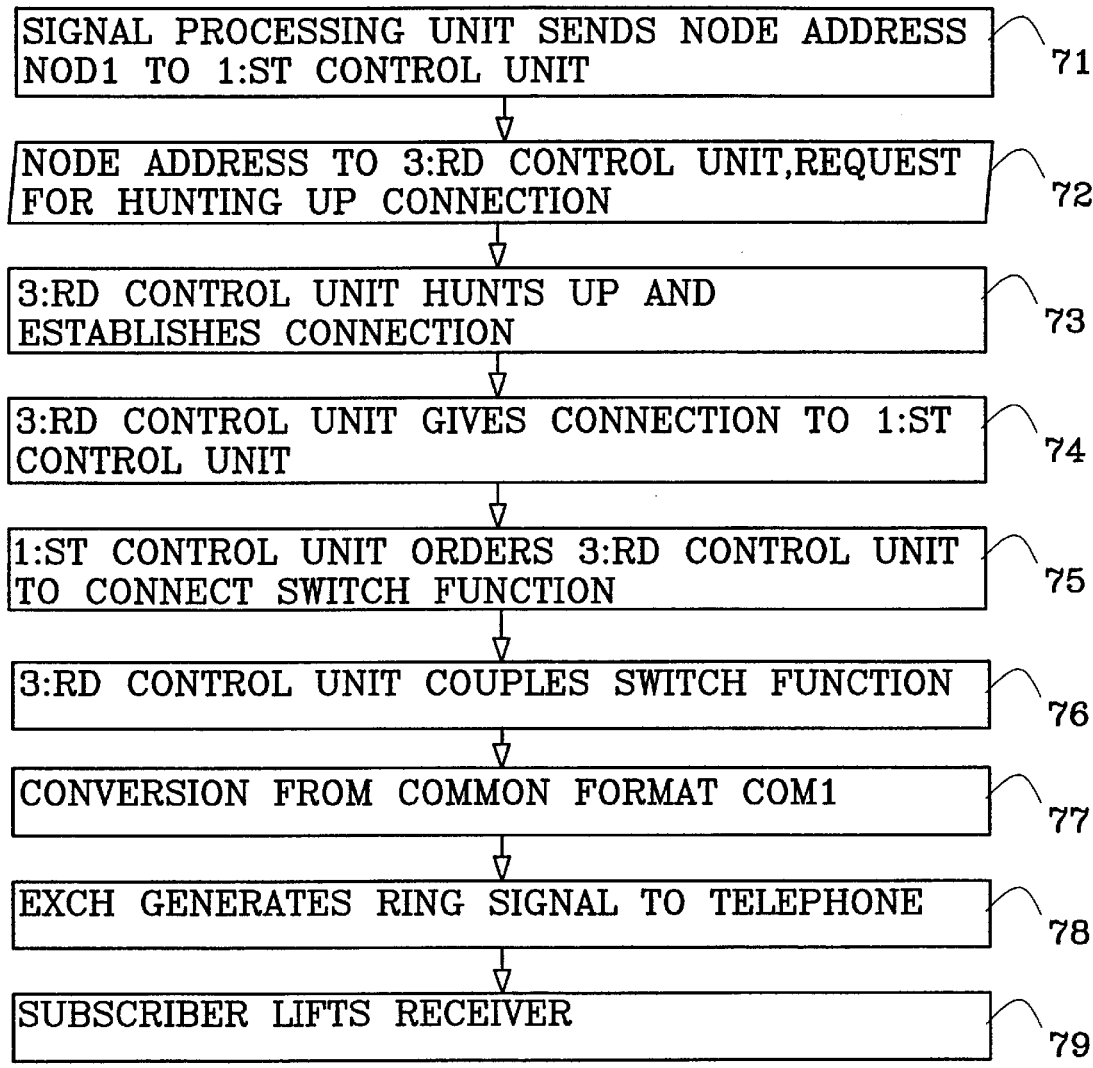
FIG. 5 shows a flow diagram for setting up the connection from the gateway to a further node in the telecom system.

In connection with FIG. 1 there was initially mentioned that the two subscribers A1 and B1 are connected to each other so as to enable them to talk. A first part in this connection is a talk demand from the subscriber A1 and setting up of the connection to the gateway MG1 with a signal converter and setting up of at least one of the telecom functions. In FIG. 3 there is shown a flow diagram of this first part of the connection.

In a conventional way the subscriber A1 enters, on his mobile MP1, the telephone number to the telephone set POT1 of the subscriber B1 in accordance with block 41 and is connected via the base station BS1 to the gateway MG1 over the connection C31 according to block 42. The signalling from the subscriber A1 is set up over the connection C1 to the control server S1, block 43. This server senses which signal format the subscriber A1 has, in this case a compressed number, and also senses that the network N1 is an ATM network, all according to block 44.

When calling from the subscriber A1 the server gets some information regarding the subscriber B1 so that the server can establish the node address for the next node that must be setup. The server S1 thereby has the information needed for interconnecting the subscribers A1 and B1. The server sends, over the connection C1, control signals in the form of the message M1 to the gateway MG1 and more particularly to the signal managing unit CP1 in accordance with block 45. The message M1 is a standard protocol with an address head and an information part distributed in different data packets. The signal managing unit CP1 separates the address head and sends the information part of the control signals with the message M2 to the first control unit CC1 in accordance with block 46. This information part is analysed by the first control unit i.a. with respect to the information about the telecom functions which are required and information regarding signal format and a network address ADR2 for the connection from the subscriber A1, all according to block 47. The first control unit CC1 sends with the message M3 a request to the second control unit RC2 for one of the telecom functions, block 48. The mobile telephone MP1 of the subscriber A1 sends coded speech which must be decoded in order to be understood with the telephone set POT1 of the subscriber B1. The message M3 thus contains a request for the telecom function F21 with a coding/decoding function. The second control unit RC2 looks for a free one of these functions in accordance with block 49 and sends its function address ADR11 with the message M4 to the first control unit CC1 in accordance with block 50. The first control unit now sends, with the message MS, the function address ADR11 for the free function F21 and the network address ADR2 for the incoming connection to the third control unit BC3 in accordance with block 51. With the message MS the first control unit also sends a request that the third control unit shall connect the network address ADR2 to the address ADR11 for the selected, free coding/decoding function F21 according to block 52. The third control unit BC3 sets up, according to block 53, the one of the switch functions corresponding to the network address ADR2, in this example the switch function CP23 for ATM switching. The switch function CP23 is interconnected with a telecom function F21 according to block 54. A speech signal TS1, that later arrives at the connection C31 from the subscriber A1, can thus be received by the switch function CP23 and be transformed to the common signal format COM1 in the signal format converter CP29. The speech signal TS1 can then be decoded via the telecom function F21, that works on the common signal format, before this speech signal is further connected.

Setting up a Further Telecom Function in the Gateway MG1

In the example above only one of the telecom functions is set up, the coding/decoding function F21. Often more telecom functions must be set up and this is the case also here. The subscriber has the telephone POT1 that must have a ring signal and furthermore there can appear echos in the connection. The tone generating function F24 and the echo extinguisher F22 have to be set up.

When the subscriber A1 called, a message regarding the called subscriber B1 was sent to the server S1. The server has thereby information regarding the node address NOD1 of the subscriber B1 and that the latter requires ring signal and echo extinguishing. This information was brought further to the gateway MG1 with the message M1 and furthermore with the message M2 and was analysed in the first control unit CC1. In connection with the flow diagram in FIG. 4 it will be described how the further telecom functions are set up in the connection.

According to block 47 in FIG. 3 the first control unit CC1 analyses the message M2. This control unit now asks for, according to block 61, the next telecom function from the second control unit RC2 with the message M3. This second telecom function is, according to the example, the telecom function F24 for tone generation. The second control unit looks for a free specimen of this function in accordance with block 62 and sends, according to block 63, the function address ADR3 of the function F24 with the message M4 to the first control unit CC1. This control unit sends with the message M5 the function address ADR3 of the telecom function F24 to the third control unit BC3 according to block 64 and also sends, according to block 65, a request to set up the telecom function F24 in the connection. The third control unit BC3 according to block 66 sets up this telecom function in the connection which in accordance with the above is in a state in which it has already converted to the common signal format COM1. The first control unit continues the analysis of the message M2 and the proceeding according to FIG. 3 is repeated if more telecom functions shall be set up. This is the case in the present example, since also the telecom function F22 for echo extinguishing with a function address ADR4 is set up in the connection when it is on the common signal format COM1.

It should be noted that the setting up procedure in the gateway MG1 will be the same as has been described in the two examples above, also if the incoming call on the connection C31 would come from another node than the base station BS1 with the address NOD2. An example of such an alternative node is another gateway, e.g. the gateway MG2 with a node address NOD3. Switch functions and telecom functions can be needed to be selected differently but the setting up procedure itself is unchanged.

Connection From the Gateway MG1 to the Subscriber B1

As has been mentioned above the server has information regarding the called subscriber B1 and can thereby establish the next node to which the call from the subscriber A1 shall be connected. The next node could, according to one example, be the next gateway MG2, but is according to the present embodiment the switch VX1 with the node address NOD1, to which the subscriber B1 is connected. How to connect the call from the subscriber A1 further with a subconnection to the switch VX1 is described below in connection with FIG. 5.

The server S1 has the information that the switch VX1 has the node address NOD1 and sends this with the message M1 to the signal managing unit CP1. This in turn sends the node address NOD1 to the first control unit CC1 with the message M2 according to block 71. The first control unit sends, with the message M5, the node address NOD1 to the third control unit BC3 together with a request to look for a free connection to the node, all according to a block 72. The third control unit BC3 looks for a free connection, according to the example the connection C41, and establishes this in accordance with block 73. The third control unit sends with a message M6 information regarding the established connection C41 to the first control unit CC1, block 74. The first control unit sends, according to block 75, the message to the third control unit BC3 to connect into circuit the one of the switch functions that responds to the established connection C41. The third control unit sets up the switch function CP21 for IP-routing to the latest set up telecom function in the connection according to the block 76. The signal format converter CP29 converts the common signal format COM1 to a signal format for the established IP-connection according to block 77. The switch VX1 is now connected and creates on a signal from the telecom function F24 a ring signal to the telephone POT1 according to block 78. The subscriber B1 receives the call by lifting his handset, block 79.

Connecting Back the Connection From the Subscriber B1 to the Subscriber A1 Via the Gateway MG1

Figure 6:
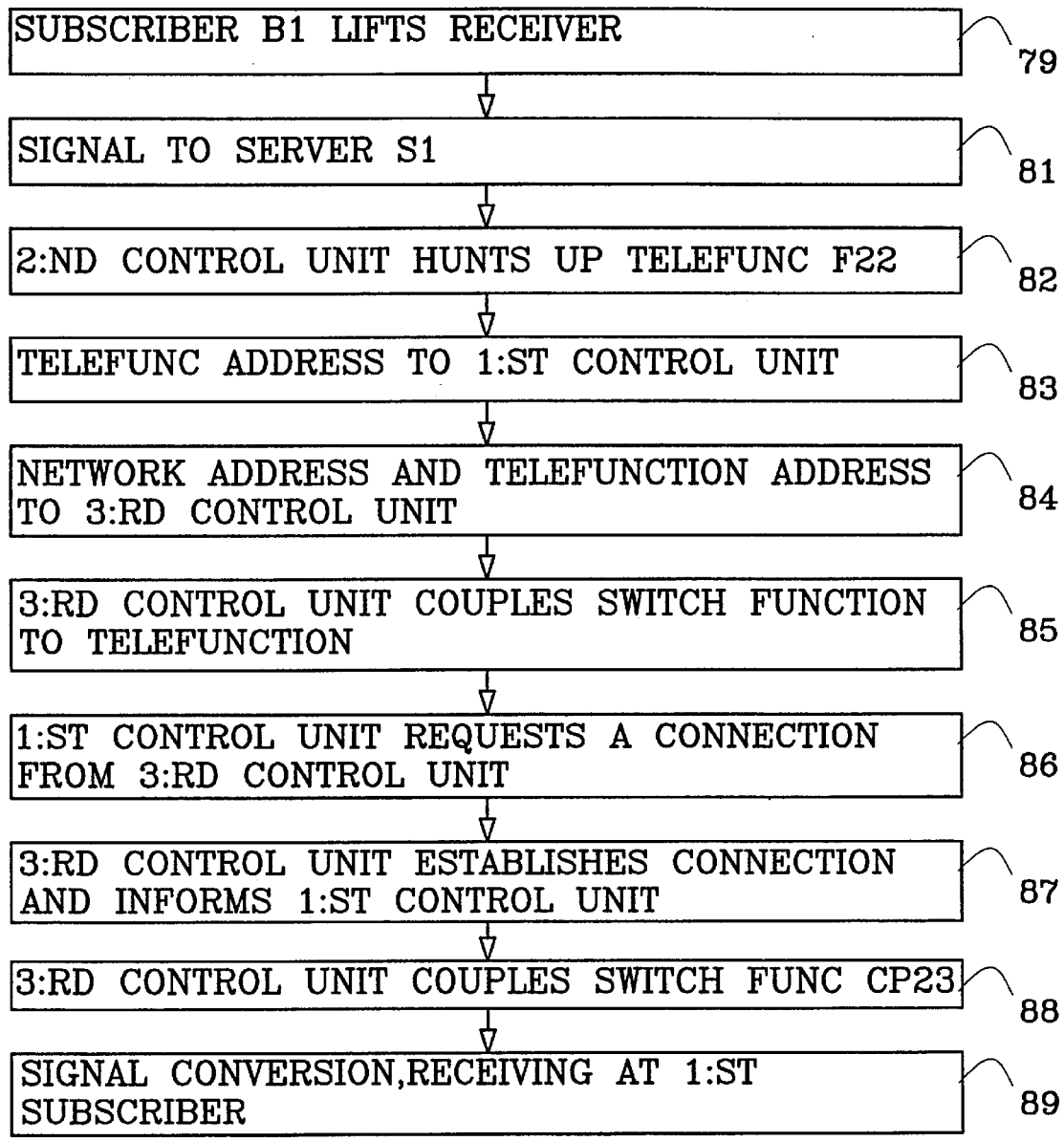
FIG. 6 shows a flow diagram for setting up a return connection to the calling subscriber.

FIG. 6 is a flow diagram that superficially illustrates how a connection from the called subscriber B1 to the calling subscriber A1 is set up so that the connection between the subscribers becomes a normal, bidirectional connection. When B1 lifts his handset according to block 79 in FIG. 5 the signal regarding this passes via the connection C1 to the server S1 which thus gets the information that the subscriber B1 has received the call, block 81. Via the message M1 and M2 the server sends its information to the first control unit CC1 which from the second control unit RC2 asks for the telecom function F21 for coding/decoding according to block 82. The second control unit provides, according to block 83, a function address ADR12 for the telecom function to the first control unit CC1. This sends to the third control unit BC3 the function address ADR12 as well as a network address ADR5 for the connection C41 from the subscriber B1, all according to block 84. The third control unit connects the switch function CP21 for IP-routing that corresponds to the network address ADR5, to the function address ADR12 of the telecom function F21 according to block 85. No further telecom functions need to be set up. The connection from the subscriber B1 to the gateway MG1 can now be converted to the common signal format COM1 in the signal format converter CP21 and speech coded in the speech coder F21 for the mobile telephone MP1 of the first subscriber A1. The first control unit CC1 sends the node address NOD2 of the subscriber A1 to the third control unit BC3 with a request for a connection, block 86. The third control unit searches a free connection, that according to the example is an ATM link on the connection C32. The control unit establishes this and sends a message regarding the connection to the first control unit CC1 according to block 87. This control unit instructs the third control unit BC3 to set up in the connection a copy of the switch function that corresponds to the connection, according to the example the switch function CP23 for ATM switching, block 88. The connection can now be converted from the common signal format COM1 to the ATM format and is received by the first subscriber A1 via the base station BS1 according to block 89. A complete two way connection has been set up between the two subscribers.

In two of the examples above the telecom function F21 has been set up. It should be noted that numerous copies of the telecom functions often exist in the gateway MG1. Different copies of the telecom function F21 with the different function addresses AD11 and ADR12 have been set up in the two-way connection between the subscribers A1 and B1.

The above example can be interpreted such that both the forward and the backward extending connection between the subscribers passes via the same lines. This need not at all be the case but more probable is that in a real case the connections are controlled to different routes by the server S1. The forward and backward extending connections need not even pass the same gateway, although this has been described in the example.

Setting up of a Telecom Function in an Existing Connection

In the already existing connection between the subscribers A1 and B1 there can be a need for setting up a further one of the telecom functions. One example of this is when the subscriber B1 is a machine, an interactive answering machine of a bank or a ticket sales unit that is controlled by tones generated in the tone signalling function F24. A synthetic voice responds and states the choices that the subscriber A1 can make. For making possible choices from the apparatus MP1 of the subscriber A1 the connection is broken and the telecom function F24 is set up in the connection. The tones that the subscriber A1 presses on his mobile apparatus MP1 are sent as a packet to the server S1. This sends over the connection C1 commands to the gateway MG1 regarding the tones to be generated to the machine of the subscriber B1. When the subscriber A1 has made his choice the telecom function F24 is disconnected again. The connection and disconnection proper of the telecom function is in correspondence with that earlier described.

Setting up a Connection Via a Further Gateway

Figure 7:
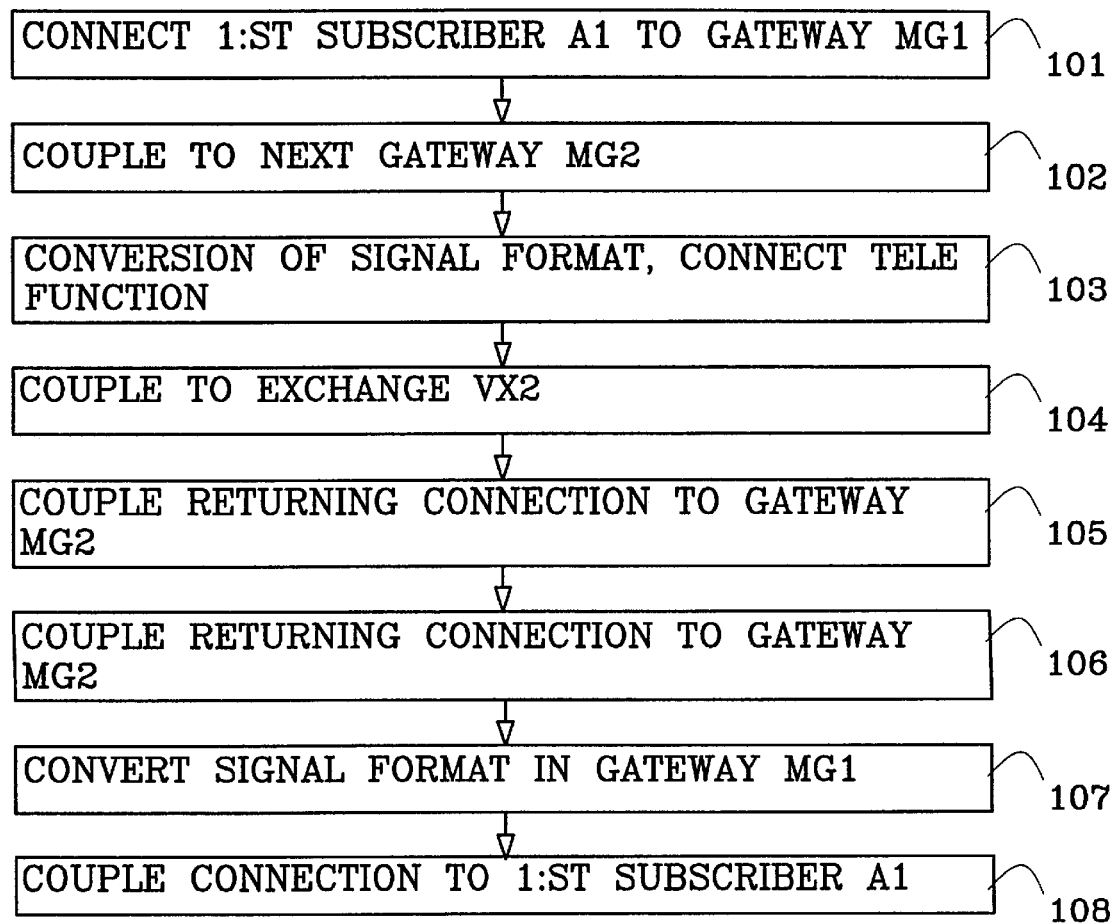
FIG. 7 shows a flow diagram for setting up a connection over more than one gateway in the telecom system.
Figure 8:
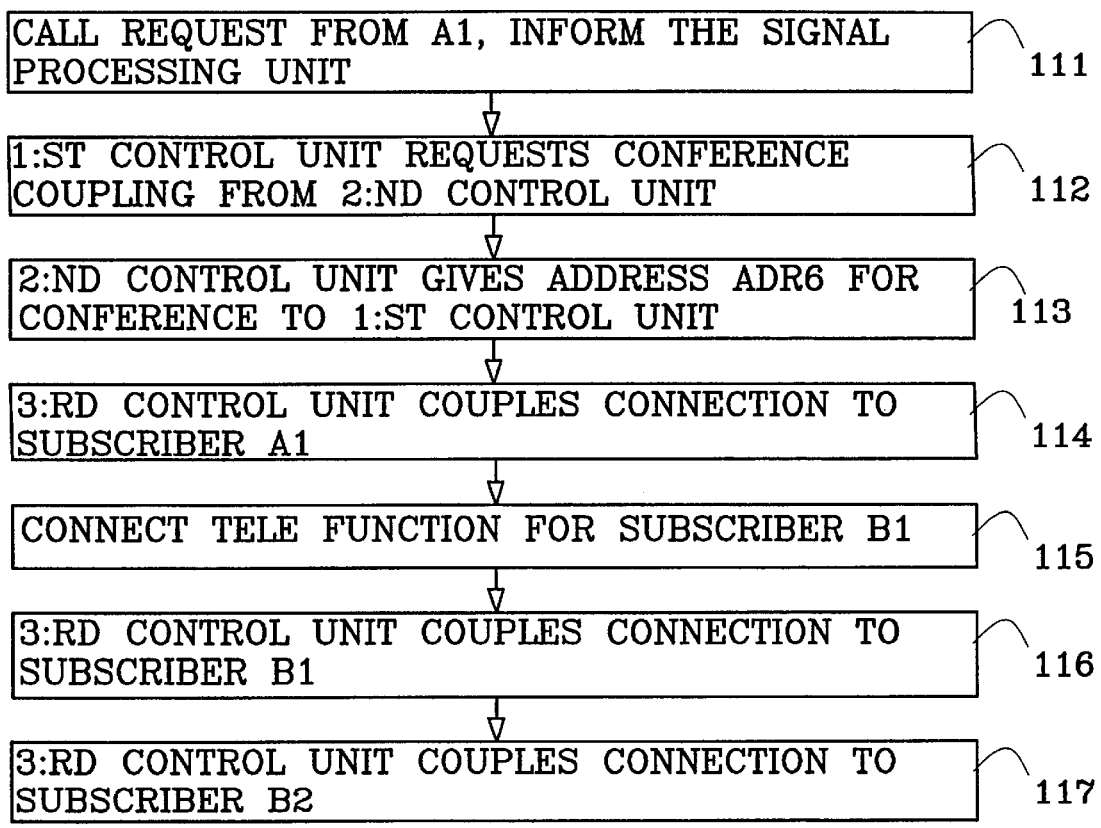
FIG. 8 shows a flow diagram for setting up a conference call.

Referring to a flow diagram in FIG. 7 setting up of a connection between the first subscriber A1 and the third subscriber B2 in the network N3 will be superficially described. In the first part of the connection from the subscriber A1 to the gateway MG1 only the switch function CP23 for ATM switching is set up and the connection is converted to the common signal format COM1. This first step is illustrated with block 101. The gateway MG1 thereafter sets up the connection further to the gateway MG2 via the network N2 according to block 102. This connection is performed in a similar way as the connection to the subscriber B1 according to the description for FIG. 5. The difference is that no ones of the telecom functions is set up in the gateway MG1 and that the server S1 orders connection to the node address NOD3 instead of the node address NOD2. Another free IP connection is searched and also established by the third control unit BC3. The switch function CP21, corresponding to the connection, is set up and a reconversion of the signal format to the IP format of the connection is performed. The connection is thereafter received in the gateway MG2 according to block 103. In this context the connection is converted from the IP format to the signal format COM1 and the three telecom functions F21, F22 and F24 are set up. It should be noted that this setting up of the telecom functions is not made until now in the gateway MG2. The connection is forwarded to the switch VX2 with the node address NOD4 according to block 104 in a similar way as has been described with reference to FIG. 5. The connection is converted to STM format and the switch function CP26 is set up. The return connection is thereafter set up from the subscriber B2 to the gateway MG2 according to block 105, the telecom function F21 for coding/decoding being then set up on the common signal format COM1 after conversion from the STM format. A free connection to the gateway MG1 with a node address NOD5 is searched by the third control unit in the gateway MG2 and the switch function CP21 is set up for conversion to the IP format, all according to block 106. According to block 107 there is performed, in the gateway MG1, conversion of the signal format from the IP format to the common signal format COM1. A free connection to the base station BS1 is searched and established by the third control unit BC3, the switch function CP23 is set up and the signal format is reconverted to the ATM format, block 108.

The reconnections in the example above performed in the respective gateway appear in more detail by the preceding embodiment.

Conference Call.

In the different examples above a connection from the first subscriber A1 has been set up to the subscriber B1 on the one hand and to the subscriber B2 on the other hand. It may also be the case that the subscriber A1 wants to have a conference call with the two subscribers B1 and B2 and such an example will be described with reference to FIG. 8. The subscriber makes a speech request and thereby presses a code on his mobile telephone MP1, including the telephone numbers of the two subscribers and a demand for set up of a conference call. As earlier the speech request is directed to the server S1 which sends relevant information to the first signal managing unit CP1, all according to block 111. The signal managing unit CP1 sends the message M2 to the first control unit CC1 which requests setting up of the telecom function F28 for conference call setting up of the second control unit RC2 according to block 112. The control unit RC2 provides a function address ADR6 for a free one of the conference functions F28 to the first control unit according to block 113. In the same way as described with reference to FIG. 3 the first control unit requests from the third control unit BC3 that the function address ADR6 should be interconnected with the network address ADR2 of the subscriber A1. The request is carried through, the switch function CP23 and the signal format converter CP29 are set up, block 114. The request for a conference connection is performed by the two connections to the subscribers B3 and B2 being set up. For the subscriber B1 the first control unit requests setting up of the telecom functions coding/decoding F21, the echo extinguisher F22 and the ring function F24 to the conference function F28 in the same way as has been described with reference to FIG. 4, block 115. Thereafter the first control unit CC1 provides, according to block 116, the node address NOD1 of the switch VX1 to the third control unit BC3 which reserves the connection C41, interconnects the ring function F24 with the switch function CP21 and sets up the signal format converter as has been described in connection with FIG. 5. For the subscriber B2 there is not required any further telecom function in the gateway MG1. The first control unit CC1 provides the node address NOD3 to the third control unit BC3 which, as above, looks for the connection and sets up the conference call function F28 to the switch function CP21 and the signal format converter CP21, block 117. The connection is thereafter forwarded to the subscriber B2 via the gateway MG2, i.a. the node NOD3, and return connections are set up from the two subscribers B3 and B2 as has been described earlier.

According to an alternative embodiment the gateway MG1 has a switch function for converting from the common signal format COM1 directly to an analogue signal format. This signal format is adapted for two-wire transmission directly to a telephone set. The gateway MG1 can use this switch function and set up the subconnection from its output directly to the telephone set POT1 of the subscriber B1 without having to go via the switch VX1. The node to which the subconnection is connected by the gateway MG1 according to this embodiment is thus the telephone set of the subscriber and the switch function for the direct conversion corresponds to this node.

Further telecom functions in the function block F2 can be used. If e.g. the subscriber B1 attends a meeting he has pressed a corresponding code on his telephone. The server S1 has information regarding this and sets up a message function F25 in the gateway MG1 when the subscriber A1 searches the subscriber B1. According to one alternative the subscriber B1 may have recorded a spoken message to calling subscribers and the server S1 then sets up a telecom function F26 for voice messages. Where appropriate the server may have setup a telecom function F27 for signal transmission between so called u-law and A-law.

Figure 10:
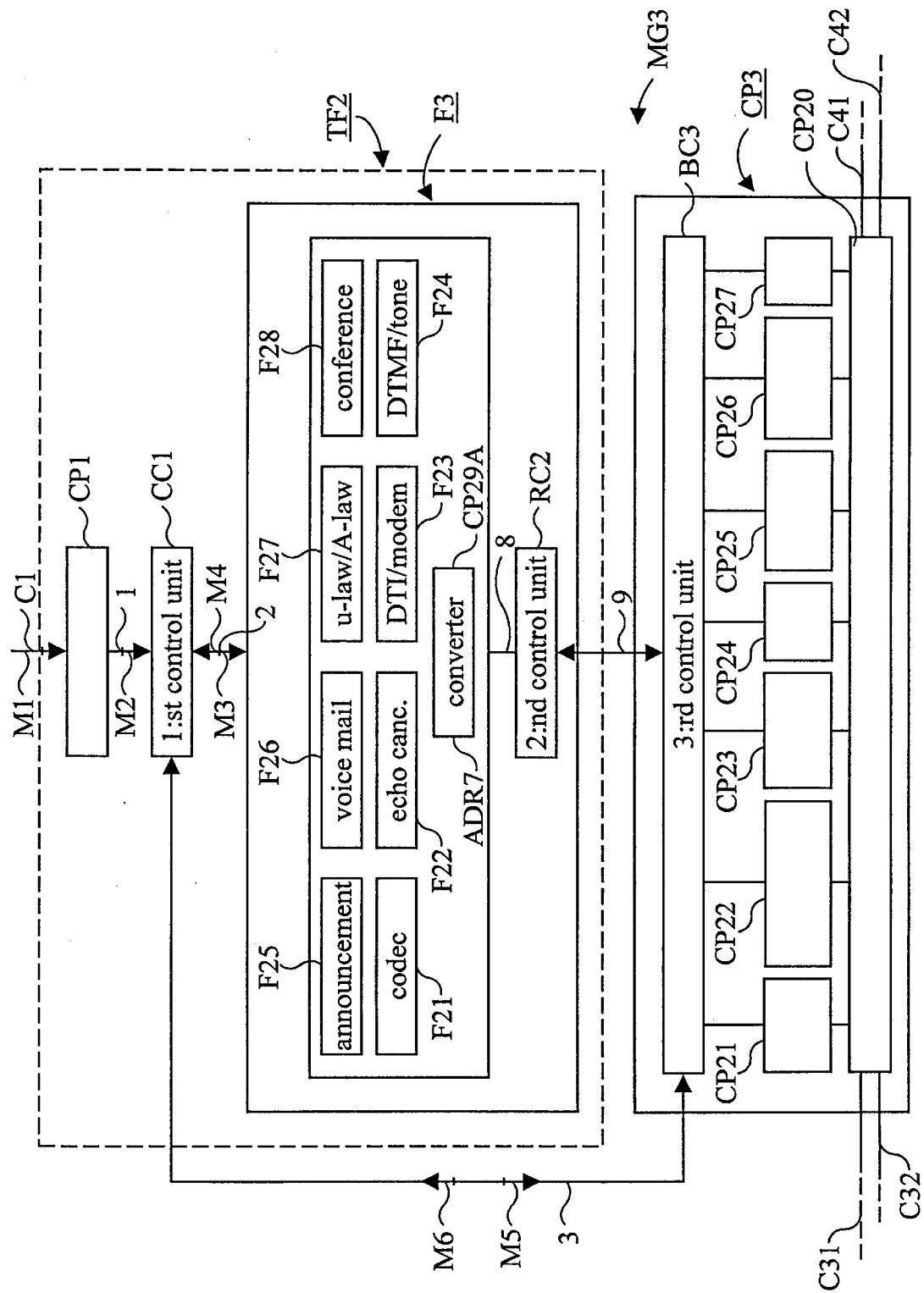
FIG. 10 shows a block diagram of an alternative embodiment of a gateway.

With reference to FIG. 10 an alternative embodiment of the invention will now be described. The Figure shows a gateway MG3 that differs somewhat from the gateway MG1 in FIG. 2. The gateway MG3 comprises a telecom functional part TF2 and has one interface block CP3. The telecom functional part TF2 has, as well as the telecom functional part TF1 in the gateway MG1, the signal managing unit CP1 with the connection C1 and the first control unit CC1 which is connected to the signal managing unit CP1 through the interface 1. The telecom functional part TF2 also comprises a functional block F3 that is connected to the first control unit CC1 through the interface 2. The functional block F3 comprises the telecom functions F21–F28 and the earlier mentioned signal format converter, which in this embodiment works as one of the telecom functions and has the designation CP29A. The functional block F3 also comprises the second control unit RC2 which is connected to the telecom functions through an interface 8. The interface block CP3 comprises the line interface CP20 which is connected through the connections C31, C32, C41 and C42. The interface block CP23 also comprises the switch functions CP21–CP27 and the third control unit BC3 which is connected to the second control unit RC2 in the functional block F3 through an interface 9. The first control unit CC1 is connected to the third control unit BC3 through the interface 3.

The difference between the gateway MG1 and the gateway MG3 is thus that the latter has its signal format converter CP29A among the telecom functions in the functional block 43 instead of having the signal format converter lying in the interface block directly in connection to the switch functions CP21–CP27. Some examples of how connections are set up in the gateway MG3 shall now be described more closely below.

Setting up of Connection From the Subscriber A1 to the Gateway MG3

Figure 11:
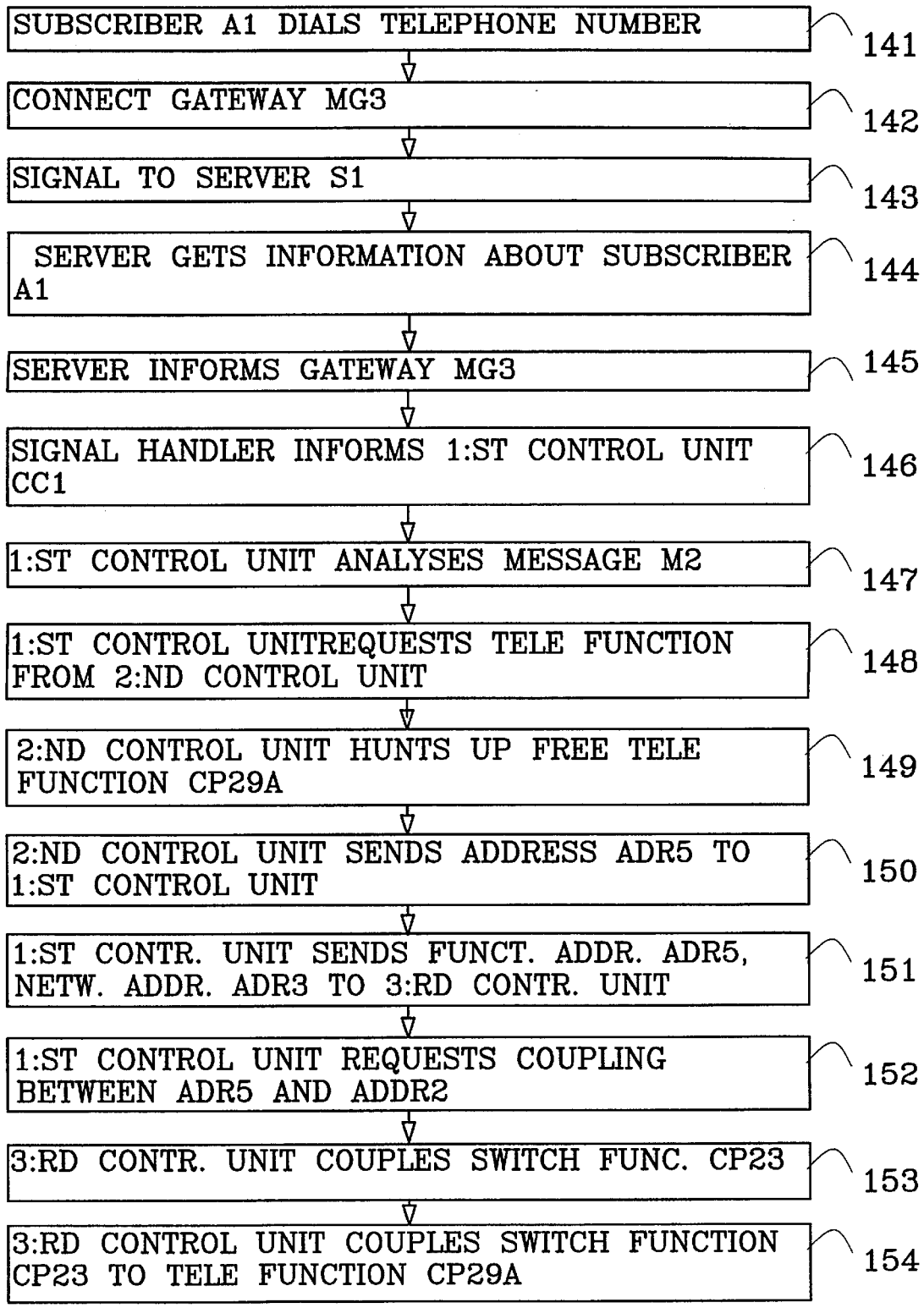
FIG. 11 shows a flow diagram for setting up a connection from a calling subscriber to the gateway in FIG. 10.

With reference to the flow diagram in FIG. 11 it will now be described how a connection is set up from the first subscriber A1 to the gateway MG3. The gateway MG1 in FIG. 1 is here replaced by the gateway MG3, this reference designation having been put within brackets in the Figure. The first steps in the connection according to this embodiment agrees mainly with the method described with reference to FIG. 3. The subscriber A1 thus in a conventional way on his mobile MP1 presses the telephone number to the subscriber he wishes to reach according to block 141 and is connected via the base station BS1 to the gateway MG3 over the connection C31 according to block 142. The signalling from the subscriber A1 is set up over the connection C1 to the control server S1, block 143. This server senses what signal format the subscriber A1 has, in this case a compressed number, and also senses that the network N1 is an ATM network, all according to block 144. When calling from the subscriber A1 the server gets certain information regarding the continuing set up so that the server can establish the node address for the next node to be set up, so that the subscriber A1 can reach the called subscriber. The server S1 thus has the information needed for connecting together the subscriber A1 with the called one. The server sends over the connection C1 control signals with the message M1 to the gateway MG3 and more particularly to the signal managing unit CP1 according to block 145. The message M1 is a standard protocol with an address head and an information part divided into different data packets. The signal managing unit CP1 separates the address head and sends the information part of the control signals with the message M2 to the first control unit CC1 according to block 146. This information part is analysed by the first control unit i.a. with respect to information regarding required telecom functions and information regarding the signal format and the network address ADR2 for the connection from the subscriber A1, all according to block 147. The first control unit CC1 sends with the message M3 a request to the second control unit RC2 for one of the telecom functions, according to the example the signal format converter, all according to block 148. The message M3 thus contains a request for the telecom function CP29A which has a signal format converting function. The other control unit RC2 looks for a free one of these functions according to block 149 and sends its function address ADR7 with the message M4 to the first control unit CC1 according to block 150. The first control unit now sends, with the message MS, the function address ADR7 for the free telecom function CP29A and the network address ADR2 for the incoming connection to the third control unit BC3 according to block 151. With the message MS the first control unit also sends a request that the third control unit shall connect the network address to the function address for the selected, free telecom function CP29A according to block 152. The third control unit BC3 sets up, according to block 153, the one of the switch functions that corresponds to the network address, in this example the switch function CP23 for ATM switching. The switch function CP23 is interconnected with the telecom function CP29A according to block 154. A speech signal TS1, that later on arrives on the connection C31 from the subscriber A1, can thus be received by the switch function CP23 and be transformed to the common signal format COM1 in the signal format converter, the telecom function CP29A.

Setting up the Connection From the Gateway MG3 to the Gateway MG2

Figure 12:
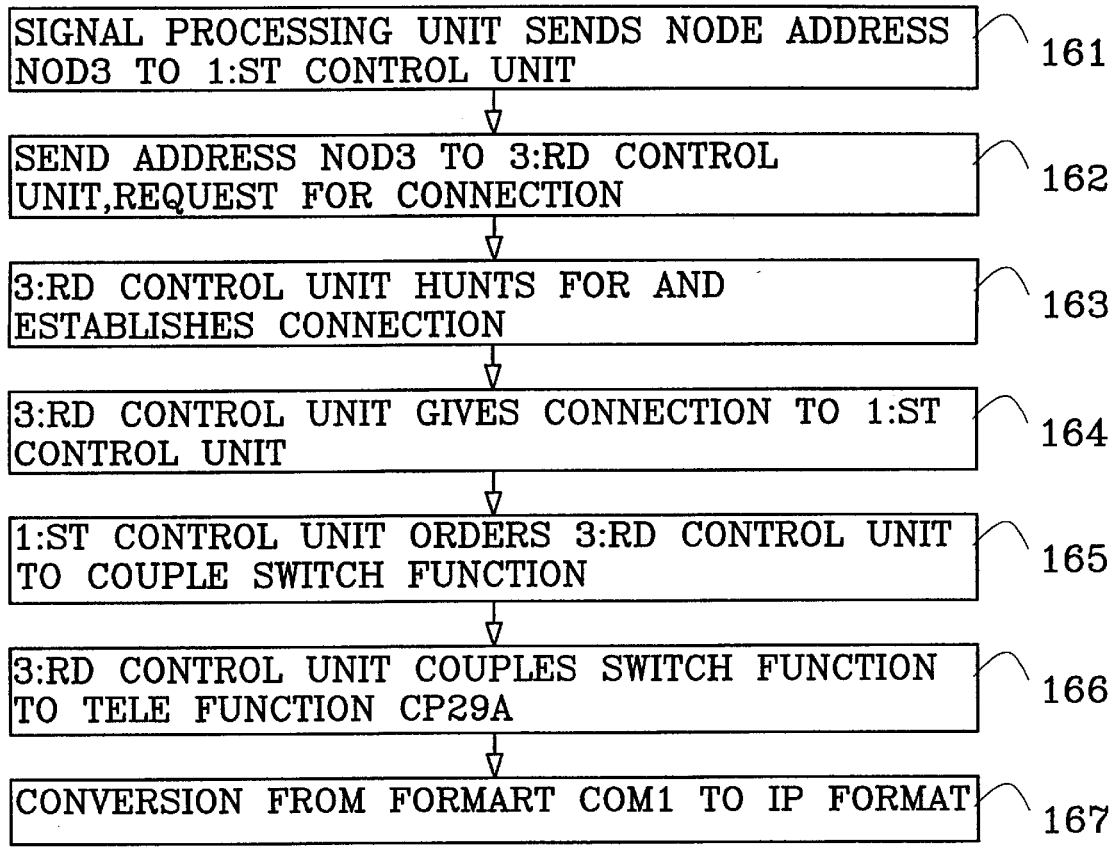
FIG. 12 shows a flow diagram for setting up the connection from the gateway in FIG. 10 to a further node in the telecom system.

As has been mentioned earlier the server has information regarding which subscriber that has been called and can thereby establish the next node, to which the connection from the subscriber A1 shall be set up. According to the following embodiment the next node is the next gateway MG2. How the connection from the subscriber A1 is forwarded with a subconnection to the gateway MG2 will now be described with reference to a flow diagram in FIG. 12.

The server S1 has information of the gateway MG2 having a node address NOD3 and sends this with the message M1 to the signal managing unit CP1. This in turn sends the node address NOD3 to the first control unit CC1 with the message M2 according to block 161. The first control unit sends, with the message M5, the node address NOD3 to the third control unit BC3 together with a request to look for a free connection to the node, all according to block 162. The third control unit BC3 looks for a free connection, according to the example the connection C41, and establishes this in accordance with block 163. The third control unit sends with a message M6 information regarding the established connection C41 to the first control unit CC1, block 164. The first control unit sends, according to block 165, message to the third control unit BC3 to set up the one of the switch functions that corresponds to the established connection C41. The third control unit sets up the switch function CP21 for IP routing to the signal format converter CP29A, which in the example is one of the telecom functions, all according to block 166. The signal format converter CP29A converts the common signal format COM1 to a signal format for the established IP connection according to block 167. The gateway MG2 is now set up and the connection can be forwarded to the subscriber searched for by the first subscriber A1.

It should be noted that in the above two examples with the gateway MG3 no further one of the telecom functions F21–F28 was set up in the connection. The gateway MG3 thus just converted from the ATM format to the common signal format COM1 and reconverted therefrom to the IP format by means of the telecom function CP29A. As in earlier examples in connection with the gateway MG1 it is however possible to set up further telecom functions. In the cases where set up is performed when a connection is in the course of being set up, first the telecom function CP29A is set up and a conversion to the common signal format is performed as has been described. Thereafter, on request by the first control unit CC1, the required telecom functions are set up in turn after each other to the already format converted connection assisted by the second control unit, also this according to the earlier description. Thereafter reconversion to the outgoing signal format is performed by the telecom function CP29A, which is connected to a suitable one of the switch functions according to the preceding example.

In the examples above the mobile telephone MP1 has been connected to the telephone sets POT1, POT2 or an answering machine. For the sake of completeness it should be mentioned that, in a way evident for the man of the art, also other apparatus can be connected together via the gateway MG1, MG2 or MG3. Examples of such apparatuses are computers, computer telephones or facsimile apparatuses.

What is claimed is:

1. An arrangement in a telecom system for setting up a connection in the telecom system, said arrangement including:

connections (C31,C32,C41,C42) to at least one network (N1) in the telecom system (TS), by which connections signals (TS1) with predetermined signal formats (ATM, IP,STM) are exchanged;

a connection (C1) to a control server (S1) in the telecom system (TS) for control signals (M2) from the control server;

a signal format converter (CP29) with switch functions (CP21–CP27) which convert the exchanged signals between the respective predetermined signal format (ATM,IP,STM) and a common signal format (COM1); and a function block (F2) with at least one telecom function (F21–F28) which can be set up to the connection, characterized in that the arrangement also includes:

a first control unit (CC1) which is arranged to receive control signals (M2) from the control server with information regarding the signal format (ATM) and network address (ADR2) of the connection;

a second control unit (RC2) in the function block (F2), which is arranged to receive a message (M3) from the first control unit (CC1) and find out at least a first one of the telecom functions (F21) corresponding to this message and return the function address (ADR11) of the found telecom function to the first control unit; and a third control unit (BC3) which is arranged to receive the network address (ADR2) and the function address (ADR11) from the first control unit (CC1) and in the connection set up the signal format converter (CP29) with the one of the switch functions (CP23) corresponding to the network address (ADR2), as well as set up the first telecom function (F21) indicated by the function address (ADR11).

2. An arrangement in a telecom system for setting up a connection in the telecom system, said arrangement including:

connections (C31,C32,C41,C42) to at least one network (N1) in the telecom system (TS), by which connections signals (TS1) with predetermined signal formats (ATM, IP,STM) are exchanged;

a connection (C1) to a control server (S1) in the telecom system (TS) for control signals (M2) from the control server;

switch functions (CP21–CP27) for the different predetermined signal formats (ATM,IP,STM); and a function block (F2) for telecom functions (F21–F28, CP29A) including at least one signal format converter (CP29A) which can be set up to the connection and which converts the exchanged signals between the respective predetermined signal format (ATM,IP,STM) and a common signal format (COM1);

characterized in that the arrangement also includes:

a first control unit (CC1) which is arranged to receive the control signals (M2) of the server with information regarding the signal format (ATM) and network address (ADR2) of the connection;

a second control unit (RC2) in the function block (F3) which is arranged to receive a message (M3) from the first control unit (CC1) and find out at least the signal format converter (CP29A) of the telecom functions and return the function address (ADR7) of the found signal format converter (CP29A) to the first control unit; and a third control unit (BC3) which is arranged to receive the network address (ADR2) and the function address (ADR7) for the signal format converter from the first control unit (CC1) and in the connection on the one hand set up the signal format converter (CP29A), and on the other hand set up the one of the switch functions (CP23) corresponding to the network address (ADR2) for the connection.

3. An arrangement according to claim 1, characterized in that the second control unit (RC2) is arranged to find a second one of the telecom functions (F22,F24) corresponding to the message (M3) from the first control unit (CC1) and return its function address (ADR3,ADR4) to the first control unit, the third control unit (BC3) then setting up the second telecom function (F22,F24) in the connection already converted to the common signal format (COM1).

4. An arrangement according to claim 1, characterized in that:

the first control unit (CC1) is arranged to also receive, among the control signals (M2) from the control server (S1), at least one node address (NOD1,NOD3) indicating to which node in the connected networks (N1,N2) the said connection shall be set up from the arrangement;

the third control unit (BC3) is arranged, on request from the first control unit (CC1), to find out at least one free subconnection (C41) to the node address (NOD1, NOD3) and establish this subconnection; and the third control unit (BC3) is arranged, on the one hand to indicate the at least one established subconnection to the first control unit (CC1), on the other hand to set up to the subconnection the one of the switch functions (CP21) that corresponds to the established subconnection.

5. An arrangement according to claim 4, characterized in that the one of the switch functions which the third control unit (BC3) is arranged to set up in the said subconnection corresponds to two-wire transmission to a telephone set (POT1).

6. An arrangement according to claim 4, characterized in that:

the first control unit (CC1) is arranged to receive, among the control signals (M2) from the control server (S1), also at least two node addresses (NOD1,NOD3) indicating to which nodes in the connected networks (N1, N2) the said connection shall be set up from the arrangement;

the second control unit (RC2) is arranged to find out, among the telecom functions (F21–F28), a telecom function (F28) for conference call set up;

the third control unit (BC3) is arranged to find out, on demand from the first control unit (CC1), at least one free subconnection to each of the node addresses (NOD1,NOD3) and establish these subconnections; and the third control unit (BC3) is arranged to indicate, on the one hand the at least two established subconnections to the first control unit (CC1), on the other hand to set up to the subconnections the switch function (CP21) corresponding to the respective established subconnection.

7. A method for setting up a connection in a telecom system, said telecom system (TS) including at least one gateway (MG1,MG2) which on the first hand has connections (C31,C32,C41,C42) to at least one network (N1,N2) in the telecom system, through which connection signals (TS1) with predetermined signal formats (ATM,IP,STM) are exchanged, on the other hand has a connection (C1) for control signals (M2) from a control server (S1) in the telecom system, said method including the method steps:

converting the exchanged signals between the respective predetermined signal format (ATM,SP,STM) and a common signal format in a signal format converter (CP29) with switch functions (CP21–CP27); and setting up of at least one telecom function (F21) to the connection, characterized in that the method also includes the method steps:

reception of the control signals (M2) with information regarding the signal format (ATM) and network address (ADR2) of the connection, in a first control unit (CC1) in the gateway (MG1);

reception of a message (M3) from the first control unit (CC1) in a second control unit (RC2);

finding out by the second control unit (RC2) at least a first of the telecom functions (F21) corresponding to said message (M3);

returning, from the second control unit (RC2), a function address (ADR11) for the found telecom function (F21) to the first control unit (CC1);

transfer of the network address (ADR2) and the function address (ADR11) from the first control unit (CC1) to a third control unit (BC3);

setting up in the connection, by the third control unit (BC3), the signal format converter (CP29) together with the one of the switch functions (CP23) that corresponds to the network address (ADR2); and setting up in the connection, by the third control unit (BC3), the first telecom function (F21) indicated by the function address (ADR11).

8. A method for setting up a connection in a telecom system, said telecom system (TS) including at least one gateway (MG1,MG2) which on the first hand has connections (C31,C32,C41,C42) to at least one network (N1,N2) in the telecom system, by which connections signals (TS1) with predetermined signal formats (ATM,IP,STM) are exchanged, on the other hand has a connection (C1) for control signals (M2) from a control server (S1) in the telecom system, said method also including the method steps:

conversion of the exchanged signals between the respective predetermined signal format (ATM,IP,STM) and a common signal format (COM1), said conversion using switch functions (CP21–CP27); and setting up at least one telecom function to the connection, characterized in that the method also includes the method steps:

reception of the control signals (M2), with information regarding the signal format (ATM) and network address (ADR2) of the connection, in a first control unit (CC1) in the gateway (MG1);

reception of a message (M3) from the first control unit (CC1) in a second control unit (RC2);

finding out, by the second control unit (RC2), a signal format converter (CP29A) among the telecom functions corresponding to said message (M3);

returning from the second control unit (RC2) a function address (ADR7) for the found signal format converter (CP29A) to the first control unit (CC1);

transferring the network address (ADR2) and the function address (ADR7) from the first control unit (CC1) to the third control unit (BC3); and setting up in the connection by the third control unit (BC3) the signal format converter (CP29A) together with the one of the switch functions (CP23) that corresponds to the network address (ADR2).

9. A method according to claim 7, characterized in that it also includes the method steps:

finding out a second one of the telecom functions (F22, F24) corresponding to the message (M3) from the first control unit (CC1), by the second control unit (RC2);

returning the function address (ADR3,ADR4) of the telecom function from the second (RC2) to the first (CC1) control unit; and setting up the second telecom function (F22,F24) of the connection already converted to the common signal format (COM1), through the third control unit (BC3).

10. A method according to claim 7, characterized in that it includes the method steps:

reception in the first control unit (CC1), from the control server (S1), of at least one node address (NOD1, NOD3) indicating to which node in the connected networks (N1,N2) the said connection shall be set up from the arrangement;

finding out at least one free subconnection (C41) to the node address (NOD1,NOD3) and establishing this subconnection, which is performed by the third control unit (BC3) on demand from the first control unit (CC1);

indicating, through the third control unit (BC3), the at least one established subconnection to the first control unit (CC1); and setting up to the subconnection the one of the switch functions (CP21) that corresponds to the established subconnection through the third control unit (BC3).

11. A method according to claim 10, characterized in that the third control unit (BC3) sets up in said subconnection one of the switch functions, that corresponds to two-wire transfer to a telephone set (POT1).

12. A method according to claim 10, characterized in that it comprises the method steps:

reception of at least two node addresses (NOD1,NOD3) indicating to which nodes in the connected networks (N1,N2) the said connection shall be set up from the gateway (MG1), said node addresses being received in the first control unit (CC1) from the control server (S1);

finding among the telecom functions (F21–F28) by the second control unit (RC2) a telecom function (F28) for conference connection;

finding at least one free subconnection to each of the node addresses (NOD1,NOD3) and establishing these subconnections, which is performed by the third control unit (BC3) on demand from the first control unit (CC1); and indicating through the third control unit (BC3) the at least two established subconnections to the first control unit (CC1);

setting up, through the third control unit (BC3), the switch function (CP21) corresponding to the respective established subconnection.

* * * * *